United States Patent [19]

Ellis et al.

[11] Patent Number: 5,088,036
[45] Date of Patent: Feb. 11, 1992

[54] REAL TIME, CONCURRENT GARBAGE COLLECTION SYSTEM AND METHOD

[75] Inventors: John R. Ellis, Woodside, Calif.; Kai Li; Andrew Appel, both of Princeton, N.J.

[73] Assignee: Digital Equipment Corporation, Maynard, Mass.

[21] Appl. No.: 297,845

[22] Filed: Jan. 17, 1989

[51] Int. Cl.$^5$ .................... G06F 12/00; G06F 12/08
[52] U.S. Cl. .................... 395/425; 364/280; 364/281.1; 364/256.3; 364/238.3; 364/254.3; 364/978.2; 364/DIG. 2; 364/DIG. 1
[58] Field of Search ... 364/200 MS File, 900 MS File

[56] References Cited

U.S. PATENT DOCUMENTS

| | | | |
|---|---|---|---|
| 4,414,624 | 11/1983 | Summer, Jr. et al. | 364/200 |
| 4,545,016 | 10/1985 | Berger | 364/200 |
| 4,775,932 | 10/1988 | Oxley et al. | 364/200 |
| 4,797,810 | 1/1989 | McEntee et al. | 364/200 |
| 4,907,151 | 3/1990 | Bartlett | 364/200 |
| 4,912,629 | 3/1990 | Shuler, Jr. | 364/200 |
| 4,961,137 | 10/1990 | Augusteijn et al. | 364/200 |

OTHER PUBLICATIONS

Henry G. Baker, Jr. "List Processing in Real Time on a Serial Computer" Communications of the ACM vol. 21, No. 4, Apr. 1978, pp. 280-294.
David A. Moon "Garbage Collection in a Large LISP System" in Proc. 1984 ACM Symp. LISP and Functional Programming.
T. McEntee "Overview of Garbage Collection in Symbolic Computing" LISP Pointers, vol. 1(3): 8-16.
R. A. Brooks, "Trading Data Space for Reduced Time and Code Space in Real Time Garbage Collection on Stock Hardware", Conference Record of the 1984 ACM Symposium on LISP and Functional Programming, Aug. 6-8, 1984, pp. 256-262.
S. C. North and J. H. Reppy, "Concurrent Garbage Collection on Stock Hardware", LNCS, vol. 274, Functional Programming Languages and Computer Architecture, Springer-Verlag, Berlin, Germany, 1987, pp. 113-133.
D. L. Detlefs, "Concurrent, Garbage Collection for C++", School of Computer Science, Carnegie Mellon University, CMU-CS-90-119, May 4, 1990.
John R. Ellis, Kai Li, and Andrew W. Appel, "Real-Time Concurrent Collection on Stock Multiprocessors", Digital Equipment Corporation, Systems Research Center, Feb. 14, 1988.
David Ungar, "The Design and Evaluation of a High Performance Smalltalk System", MIT Press, 1987.
Robert A. Shaw, "Improving Garbage Collector Performance in Virtual Memory", Technical Report CSL-TR-87-323, Computer Systems Laboratory, Stanford University, 1987.

*Primary Examiner*—Thomas C. Lee
*Assistant Examiner*—Mehmet Geckil
*Attorney, Agent, or Firm*—Flehr, Hohbach, Test, Albritton & Herbert

[57] ABSTRACT

A real-time, concurrent garbage collection system and method uses the virtual-memory page protection mechanisms of a standard computer system to collect used storage space in a heap. The heap is divided into old-space and new-space portions, each of which is further divided into a multiplicity of pages. At least one mutator thread modifies and adds objects to new-space. Two garbage collection process threads are used: a fault processing thread, and a concurrent scanning thread, both of which help to collect the accessible objects in old-space. The garbage collector initially copies only the root objects, or a portion of the root objects, to new-space. In addition, all pages of new-space which contain copies of old-space objects are initially marked as being protected. Whenever the mutator tries to access an object in a protected page, a page-access trap is generated. The fault processing thread of the garbage collector responds to the trap by scanning the objects in the referenced page, copying old-space object and forwarding pointers as necessary. Then it unprotects the page and resumes the mutator at the faulting instruction. The concurrent scanning thread of the garbage collector executes concurrently with the mutator, scanning the protected pages in new-space and unprotecting them as each is scanned. The two collection threads together provide an efficient, medium-grained synchronization between the collector and the mutator.

7 Claims, 5 Drawing Sheets

REAL TIME, CONCURRENT GARBAGE COLLECTION SYSTEM AND METHOD

The present invention relates to computer systems, and particularly to garbage collection in real-time and multiprocessor computer systems.

BACKGROUND OF THE INVENTION

Many computer systems dynamically allocate memory to a task. The following is a somewhat simplified explanation of dynamic memory allocation and garbage collection.

Figure 1:
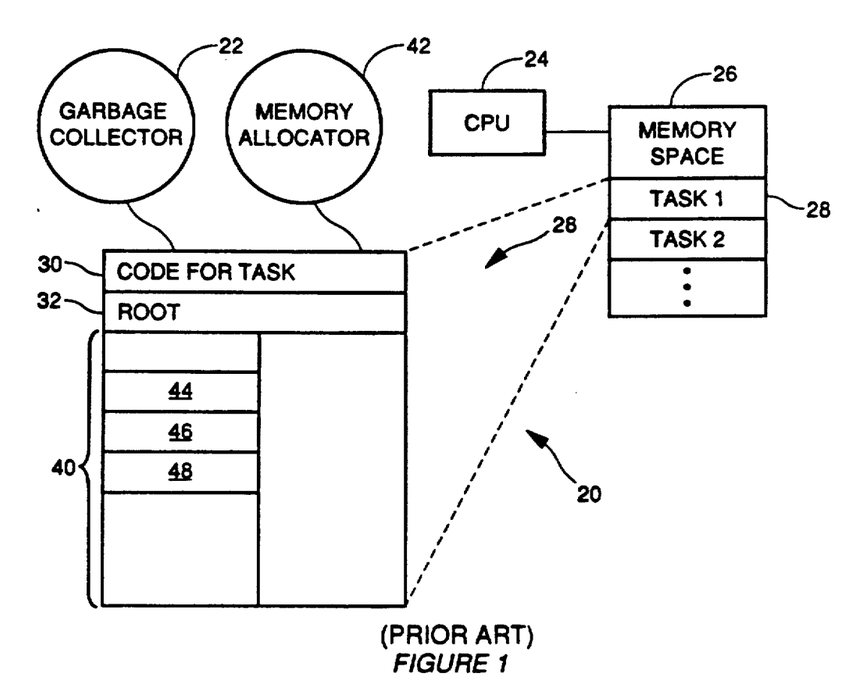
FIG. 1 is a block diagram of a multitasking, single CPU computer system using garbage collection.

Referring to FIG. 1, a typical multitasking computer system 20 which uses a garbage collector 22 includes a CPU 24 and a defined memory space 26, which may include virtual memory. Each active task in the system is assigned a portion 28 of the computer's memory space 26. The task's memory space 28 can be divided into three regions: one region 30 for holding the code which represents and controls the task, another region 32 that contains a set of "root" pointers used by the task, and a third region 40, called the heap, which is used for dynamic memory allocation.

It should be understood that FIG. 1 represents only one of many ways in which memory may be allocated for storing the roots, code and heap associated with a task or a set of tasks.

For the purposes of this description, the terms "task", "mutator", "mutator thread", "thread" and "process" are used interchangeably. Tasks and programs are sometimes called mutators because they change or "mutate" the contents of the heap 40. The term "thread" relates to the continuity of a task or process, especially in multi-threaded environments in which each process is periodically interrupted by other ones of the processes in the system.

The term "object" is herein defined to mean any data structure created by a program or process. Objects are sometimes herein called program objects.

When the task associated with the heap 40 needs space for storing an array or other program "object", a Memory Allocator routine 42 is called. The memory allocator 42 responds by allocating a block of unused memory 44 in the heap 44 to the task. Additional requests for memory will result in the allocation of additional memory blocks 46, 48 and so on. Clearly, if the task continues to ask for more memory, all the space in the heap 40 will eventually be used and the task will fail for lack of memory. Therefore space must be restored by either explicit actions of the program, or some other mechanism.

It is well known that most tasks "abandon" much of the memory space that is allocated to them. Typically, the task stores many program objects in allocated memory blocks, and discards all pointers to many of those objects after it has finished processing them because it will never need to access those objects again. An object for which there are no pointers is often termed an "inaccessible object", and the memory space it occupies is "inaccessible" to the task which once used it.

The solution to this problem is to recover blocks of memory space in the heap 40 which are no longer being used by the task. Garbage collection is the term used to refer to automatic methods of recovering unused memory in the heap 40. Garbage collectors generally gather and recover unused memory upon the occurrence of a certain amount of memory usage, most typically when half of the storage space in the heap 40 has been allocated.

Thus, the purpose of garbage collection is to recover unused or abandoned portions of memory in a heap 40 so that the task using the heap 40 will not run out of memory.

Stop and Copy Garbage Collection. Stop and Copy garbage collectors compact the memory used by a task by copying all "accessible objects" in the heap to a contiguous block of memory in the heap, and changing all pointers to the accessible objects so as to point to the new copy of these objects. An accessible object is any object (i.e., block of memory) which is referenced, directly or indirectly, by the "roots" or "root set" of the task. Typically, the "roots" of a task are a set of pointers stored in known locations (generally in the program stack and registers used by the task), which point to the objects used by a task. Many of those objects, in turn, will contain pointers to other objects in the task. The chain, or graph, of pointers emanating from the root set indirectly points to all of the accessible objects in the heap.

The entire set of objects referenced by these pointers is herein called the set of accessible objects. Inaccessible objects are all objects not referenced by the set of pointers derived from the root.

By copying all accessible objects to a new contiguous block of memory in the heap, and then using the new copy of the objects in place of the old copy, the Stop and Copy garbage collector eliminates all unused memory blocks in the heap. It also "compacts" the memory storage used by the task so that there are no "holes" between accessible objects. Compaction is a desirable property because it puts all of the memory available for allocation to a task in a contiguous block, which eliminates the need to keep track of numerous small blocks of unallocated memory. Compaction also improves virtual memory performance.

Figure 2:
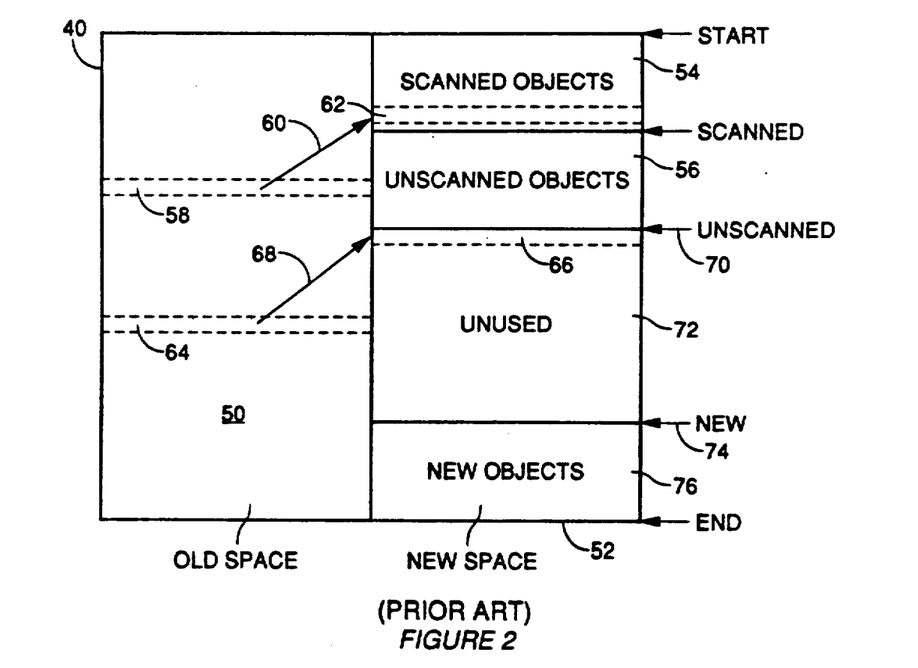
FIG. 2 depicts the classic Stop and Copy garbage collection process.

FIG. 2 shows a "snap shot" of the Stop and Copy garbage collection process. "Old-space" 50 is the half of the heap 40 which was recently filled up and is now being compacted by copying the accessible objects into "new-space" 52. At the time of this snap shot the copying process has been only partially completed. As shown, new-space 52 is divided into several regions. Regions 54 and 56 both contain objects that have been copied from old-space. The objects in region 54 have already been "scanned", while those in region 56 are "unscanned".

When an object is scanned, all of the pointers in the object are inspected to determine whether they point to objects in new-space or old-space. Pointers to new-space objects need no further processing. Pointers to old-space objects are processed as follows. If the object 58 in old-space referenced by the pointer contains a "forwarding pointer" 60, this means that the referenced object has already been copied into new-space, and the pointer being processed is simply replaced with a copy of the forwarding pointer 60. The resulting pointer points to an object 62 in new-space 52 which is a copy of the object 58 in old-space 50.

If, however, a referenced object 64 in old-space does not contain a forwarding pointer, then a copy 66 of the referenced object 64 must be made in new-space 52, and a forwarding pointer 68 must be placed in the old-space object 64 so that object 64 will not be copied more than once into new-space 52. Note that objects are copied into new-space at the position of the UNSCANNED pointer 70, thereby using up a portion of the unused region 72 of new-space 52. After the object is copied into new-space, the position of the UNSCANNED pointer 70 is adjusted to point to the next available space in the unused region 72.

Stop and Copy garbage collection proceeds by sequentially scanning all of the objects in the unscanned region 56. As each object is scanned, the SCANNED pointer is advanced by one program object. The scanning process continues until there are no objects in the unscanned region 56. Once the scanning process is complete, garbage collection is complete, and the primary task associated with the heap 40 can be resumed.

After the completion of garbage collection, new objects created by the task are added to the New Object regions 76, which is at the end of the unused regions 72, at the position of the NEW pointer 74. New-space 52 is filled and a new garbage collection cycle must be started when there is insufficient space in the unused region 72 to store a new program object.

Generally, the new-space copy of a task's accessible objects occupies less space than the old-space copy, because old-space included abandoned, inaccessible objects. After copying the accessible objects into new-space 52, old-space 50 is unused until new-space 52 is completely filled with program objects. At that time, old-space and new-space are "flipped" (i.e., definitions of "old" and "new" space are interchanged), and the garbage collection process resumes.

An attractive property of Stop and Copy garbage collectors is that such collectors can have a running time proportional to the amount of accessible storage. The reason for this is that Stop and Copy collectors only process accessible objects, and ignore unaccessible objects. Thus, for example, if only thirty-five percent of the allocated memory space in the heap 40 is retained during garbage collection, the Stop and Copy collector only processes thirty-five percent of the allocated space.

However, a traditional Stop and Copy garbage collector cannot be used in a real-time computer system because the "latency" of the collector (i.e., the maximum amount of time that the mutator task is interrupted at any one time by the collector) can exceed the requirements of the real-time system. In other words, it is generally not possible to complete a Stop and Copy garbage collector cycle in less than the maximum latency of a real-time computer system.

In summary, the primary problem with using classical Stop and Copy garbage collectors in real-time computer systems is that the collector stops the other tasks in the computer for an unacceptably long period of time.

Baker's Algorithm. The garbage collection algorithm known as Baker's Algorithm is perhaps the best known real-time garbage collection algorithm. As will be described below, Baker's Algorithm has several major liabilities, including the facts that it is not concurrent and requires the use of specialized hardware in order for it to be implemented efficiently. See H. G. Baker, "List processing in real time on a serial computer", Communications of the ACM, 21(4):280-294, 1978.

Referring to FIG. 2, when new-space 52 fills up, the Baker collector stops the mutator, flips old-space and new-space, but then copies only the root objects into new-space (for example, those referenced by the mutator's registers). It then resumes the mutator immediately. Accessible objects are copied incrementally from old-space 50 to new-space 52 while the mutator executes. In particular, every time the mutator allocates a new object, the collector 22 is invoked to copy a few more objects from old-space (i.e., to scan a few more objects in the unscanned region 56).

In addition, in order to make the garbage collector invisible to the mutator, it is necessary to ensure that the mutator sees only new-space pointers in its registers. To accomplish this, every pointer fetched by the mutator must be checked to see if it points to old-space. If a fetched pointer points to an old-space object, the old—space object is copied to new-space and the pointer is updated; only then is the pointer returned to the mutator. As a result, old-space pointers are replaced with new-space pointers before they can be processed by the mutator, and therefore the mutator only sees new-space objects.

In systems using Baker's garbage collection algorithm, every fetch of a pointer and allocation of a new object is slowed down by a small, bounded amount of time. Thus the latency of the garbage collection (copying) process is low and Baker's algorithm is suitable for real-time applications.

The pointer checking called for by Baker's algorithm requires hardware support to be implemented efficiently. In particular, every pointer in the heap must be tagged with a one-bit or multi-bit flag that identifies old-space pointers and new-space pointers. The tag checking hardware required by the Baker collector inspects the tag associated with each pointer and calls an object copying routine when the inspected pointer references an object in old-space.

It should be noted that Baker's garbage collection algorithm is not concurrent because the mutator stops whenever the collector does a bit of work. Also, implementing a concurrent version of Baker's algorithm on a multiprocessor computer would require fine-grain locking on each object, adding more overhead.

It is noted that Baker's garbage collection algorithm can be implemented on stock hardware at the cost of an extra word per object, an extra memory indirection per object reference, and several extra instructions to change the contents of a cell. See Rodney A. Brooks, "Trading data space for reduced time and code space in real-time garbage collection on stock hardware," SIGPLAN Notices, Proceedings of ACM SIGSOFT/SIGPLAN Software Engineering Symposium on Practical Software Development Environments, pages 256-262, 1984.

Real-Time Collection Recuirements. The most typical requirement of a real time computer system is that the real-time tasks or mutators in the system must never be interrupted for longer than a very small constant time.

A collector has small "latency" if the interruptions of the mutators are short. An interactive workstation typically requires latencies of less than 0.1 second if collections are not to affect communications, mouse tracking, or animation on the screen.

A garbage collection program or task is said to be "concurrent" if the collector can do its work in parallel with another task (i.e., the mutator). A concurrent collector should allow for multiple mutator threads (processes) and multiple processors. Concurrency is useful even on a single processor computer, because the collector can run while the mutator is waiting for external events such as user input, page faults, and i/o.

A garbage collection program or task is said to be "efficient" if the amortized cost to allocate and collect an object is small compared to the cost of initializing the object.

An algorithm runs on "stock hardware" if it can run on standard commercial computer architectures such as the VAX and the 68000. We assume that any multiprocessor computers used with a concurrent garbage collector have an efficient shared memory.

Shared-memory multiprocessors are becoming widespread, so it's important to find efficient concurrent collection ( algorithms. With today's technology, the marginal cost of adding extra processors and caches to a machine is small. Most new large mainframe computers are multiprocessors, and it has been shown that it is also economical to build multiprocessor workstations. See C.P. Thacker, L.C. Stewart, and E.H. Satterthwaite, Jr., "Firefly: A Multiprocessor Workstation," Research Report 23, Digital System Research Center, Dec. 30, 1987.

Synchronization insures that objects in the heap are not referenced simultaneously by the garbage collector and a mutator. Fine-grained synchronization between the collec tor and the mutator is a problem for concurrent collectors because fine-grained synchronization either requires special hardware (which is expensive), or it requires extra instructions to be executed by the mutator and collector, which negatively impacts the speed of operation of the mutator. The present invention solves this problem by providing a less expensive medium-grained synchronization.

SUMMARY OF THE INVENTION

It is a primary object of the present invention to provide a real-time, concurrent garbage collection system and method.

It is another object to provide a real-time, concurrent garbage collection system and method suitable for use in a shared-memory multiple processor "stock" computer system (i.e., one without special hardware for garbage collection) and which is efficient.

In summary, the present invention is a real-time, concurrent garbage collection system and method which uses the virtual-memory page protection mechanisms of a standard computer system to collect used storage space in a heap. The heap is divided into old-space and new-space portions, each of which is further divided into a multiplicity of pages. At least one mutator thread modifies and adds objects to new-space.

Two garbage collection threads are used: a fault processing thread, and a concurrent scanning thread, both of which help to collect the accessible objects in old-space. The garbage collector initially copies only the root objects, or a portion of the root objects, to new-space. In addition, all pages of new-space which contain copies of old-space objects are initially marked as being protected.

Whenever the mutator tries to access an object in a protected page, a page-access trap is generated. The fault processing thread of the garbage collector responds to the trap by scanning the objects in the referenced page, copying old-space objects and forwarding pointers as necessary. Then it unprotects the page and resumes the mutator at the faulting instruction.

The concurrent scanning thread of the garbage collector executes concurrently with the mutator, scanning the protected pages in new-space and unprotecting them as each is scanned. The two collection threads of the present invention together provide an efficient, medium-grained synchronization between the collector and the mutator.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Conceptually, the present invention is a special version of the Stop and Copy garbage collector described above. In particular, objects in the heap are collected, and the new-space objects are scanned in almost the same order as in the classic Stop and Copy collector. What is different is when the garbage collection is done.

In particular, the garbage collection process is broken into many short jobs, each of which is shorter in duration than the maximum allowed latency of the mutator task. The problem is how to accomplish this on a standard computer system, without requiring the use of new, specialized hardware, and how to do it efficiently.

Figure 3A:
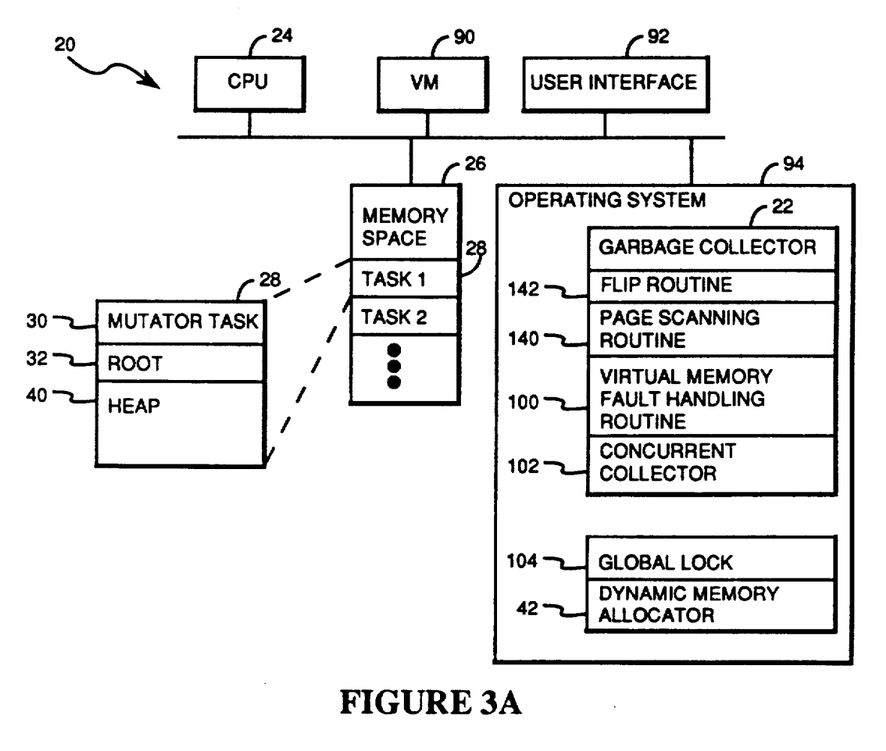
FIGS. 3A and 3B are block diagrams of the present invention.
Figure 3B:
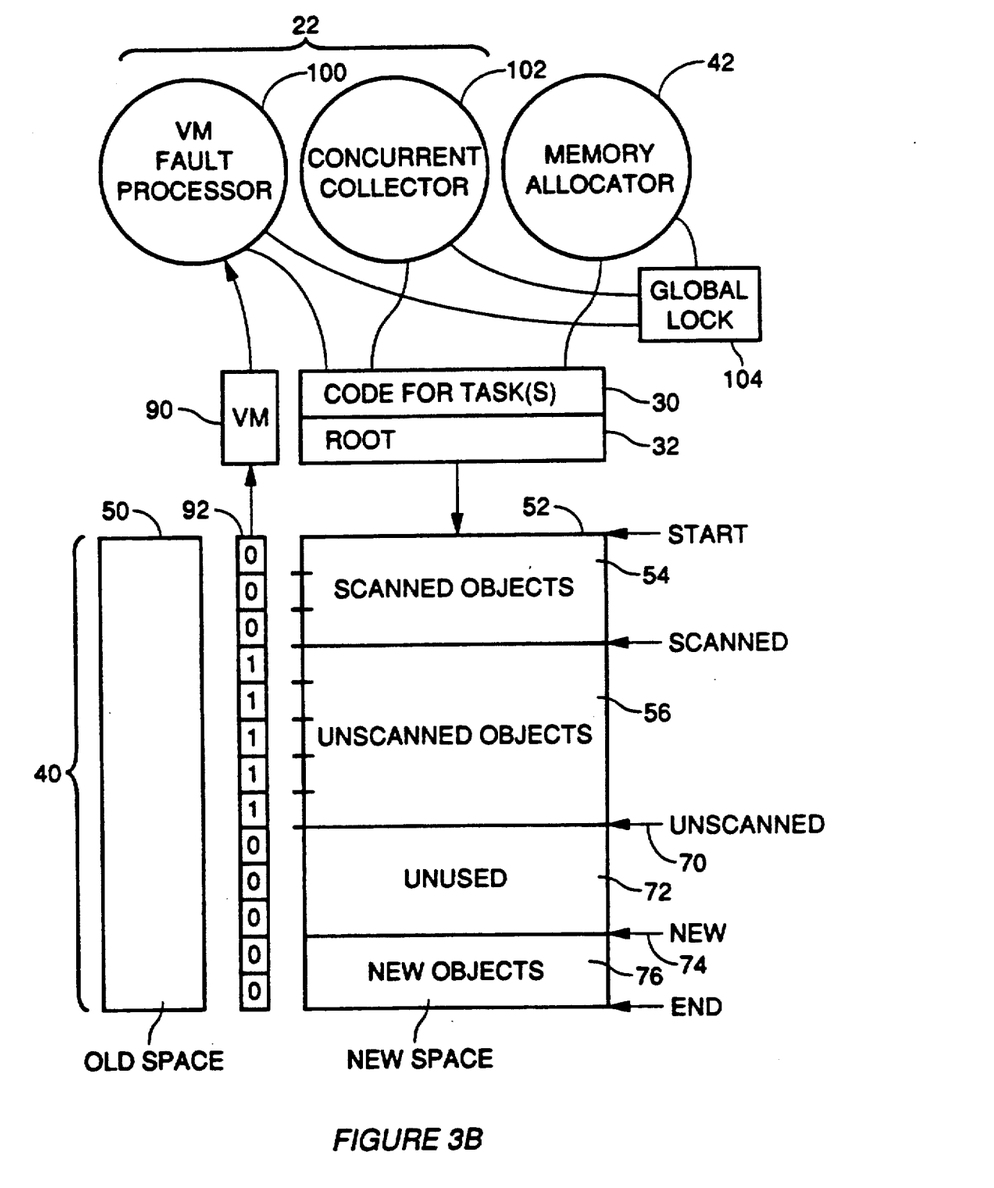

Referring to FIGS. 3A and 3B, the preferred embodiment is designed for use in a computer system 20 with a standard virtual memory protection subsystem 90. As shown in FIGS. 3A and 3B, the computer system 20 includes the system features of FIG. 1 as well as a user interface 92 and an operating system 94, which includes the garbage collector 22, and dymaic memory allocator 42. The virtual memory system includes an array of protection flags 92, one for each page of the memory space assigned to a particular task. While the flag for each page is usually a multibit flag, with each bit having a predefined function, for the purposes of illustration only a one-bit flag is shown in FIG. 3B.

The one-bit virtual memory protection flag shown for each page is herein called the NOACCESS flag. When a NOACCESS flag is set equal to 1, any attempt by the mutator task 30 to access the corresponding page causes a virtual memory "NOACCESS trap", also known as a page trap or a page fault. A virtual memory trap is much like an interrupt, except that the trap is handled by the virtual memory subsystem 90, instead of an interrupt handler.

As will be explained in more detail below, in the preferred embodiment the virtual memory system is programmed to respond to NOACCESS traps by calling a garbage collecting fault processor 100. The fault processor 100 scans the page which the mutator was trying to access, which means that all old-space pointers in that page are replaced with new-space pointers, and then control is returned to the mutator 30.

The present invention maintains the following conditions throughout the garbage collection process:

The mutator sees only new-space pointers in its registers.

Objects in the New Object area 76 contain only new-space pointers.

Objects in the scanned region 54 contain only new-space pointers.

Objects in the unscanned area 56 can contain both old-space and new-space pointers.

Thus, only the unscanned area 56 can contain old-space pointers.

As shown in FIG. 3, the garbage collector 22 of the present invention sets the virtual-memory protection (i.e., the NOACCESS flag) of the unscanned area's pages to be "no access." Whenever the mutator tries to access an unscanned object, a page-access trap is generated. The Page Trap (i.e., page fault processing) 100 portion of the collector 22 fields the trap and scans the objects on that page, copying old-space objects and forwarding pointers as necessary. Then it unprotects the page and resumes the mutator at the faulting instruction. To the mutator, that page appears to have contained only new-space pointers all along, and thus the mutator will fetch only new-space pointers to its registers.

A second portion of the collector, called the Concurrent Scan thread 102, executes concurrently with the mutator, scanning pages in the unscanned area and unprotecting them as each is scanned. The more pages scanned concurrently, the fewer page-access traps taken by the mutator.

This method of using the virtual-memory hardware 90, which is provided in most computer systems (other than older microcomputers), provides an efficient, medium-grained synchronization between the collector and the mutator. Because the mutator doesn't do anything extra to synchronize with the collector, use of the present invention does not require revision of a computer's compilers.

As will be explained in more detail below, multiple processors and mutator threads are accommodated with almost no extra effort, since the operating system must support concurrent operations on virtual memory anyway.

Initially, we,ll assume that objects are no larger than a page and that the collector never copies an object so that it crosses a page boundary. Later we'll relax these constraints.

Page Traps and Concurrent Scanning

Figure 7:
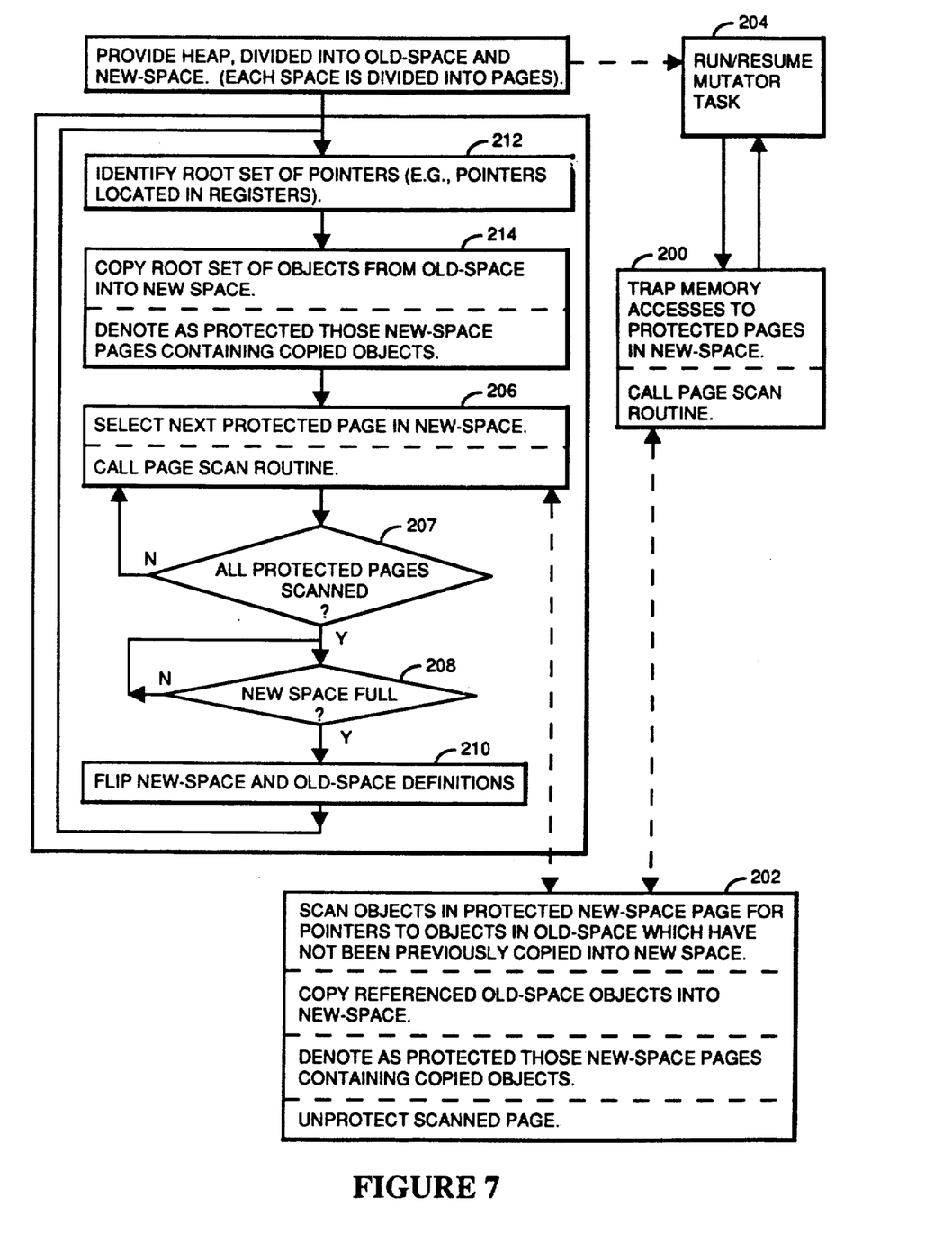
FIG. 7 is a flow chart of the garbage collection process of the present invention.

Referring to FIGS. 3 and 7, the present invention performs garbage collection using two threads, herein called the Page Trap thread and the Concurrent Scan thread. The Page Trap thread handles access traps while the Concurrent Scan thread scans the unscanned area concurrently with the mutator.

A single global "lock" 104, herein denoted as the "gcLock" protects the use of the scanned, unscanned, and new pointers by the two garbage collection threads 100 and 102 and the memory allocator routine 42. As will be understood by those skilled in the art, the function of a lock 104 is to allow only one task or thread to use a particular resource at any one time. In this case the protected resource is the set of pointers (start, scanned, unscanned, new, end) in new-space.

The Page Trap thread executes as shown in the following pseudocode program.

```
PAGE_TRAP( ) =
LOOP
        thread, pageAddress := WaitForTrappedThread( )
        LOCK gcLock DO
                ScanPage( pageAddress )
        ResumeThread( thread )
; end of loop
```

The Page Trap thread waits for a page-access trap from a mutator thread, grabs the lock (step 200 in FIG. 7) scans and unprotects the trapped page (step 202), and then resumes the mutator thread (step 204).

The scanner thread (steps, 206, 207, 208, 210) scans unscanned pages continually:

```
CONCURRENT_SCAN( ) =
    LOOP
        LOCK gcLock DO
            WHILE NOT (scanned < unscanned) DO
                WAIT( gcLock, unscannedPages )
            ScanPage( scanned )
            scanned := MIN( scanned + PageSize, unscanned)
    ; end of loop
```

Note that the WAIT gcLock, condition) function, also known as the WAIT primitive, releases the lock gcLock until the "condition" is signalled. This type of use of a WAIT primitive in combination with a global lock is well known to those skilled in the art. The WAIT primitive reacquires the lock when the condition is signalled. In this way, the "scanned" and "unscanned" resources are protected by the lock while they are examined by the WAIT primitive When the scanned pointer catches up with the unscanned pointer (step 207) there are no more objects to be copied from old-space until after the next flip (step 210) (i.e., the beginning of the next garbage collection cycle). Thus, when scanned and unscanned pointers coincide, the scanner thread blocks (i.e., becomes inactive) until old-space and new-space are flipped, which signals the unscannedPages condition variable, indicating that there are more pages to be scanned.

The ScanPage procedure (step 202) is called by both the Page Trap and scanner threads with a parameter equal to the address of an object in the page to be scanned:

```
ScanPage( objectAdr ) =
    page = Page( objectAdr )
    IF Unprotected( page ) THEN RETURN
    WHILE Page( objectAdr ) = page AND
            objectAdr < unscanned
    DO
        ScanObject( objectAdr )
        objectAdr := objectAdr + ObjectSize(objectAdr)
    Unprotect( page )
ScanObject( objectAdr ) =
    For each pointer in object DO
        If pointer is to an old-space object THEN
            If old-space object has a forwarding pointer THEN
                replace pointer by forwarding pointer
            ELSE
                copy old-space object to unscanned
                set the forwarding pointer of old-space object
                    to point to its new-space location
                unscanned := unscanned + ObjectSize( objectAdr )
; end of DO loop
```

If the page is unprotected, that means its objects have already been scanned, so the ScanPage routine returns immediately. Otherwise, ScanPage successively scans all the objects in the page, advancing the scanned pointer after processing each object.

The ScanObject routine processes each pointer in an object. If a pointer already points to an object in new-space no further processing of that pointer is necessary. If a pointer points to an object in old-space, the ScanObject routine first checks to see if that object has a forwarding pointer. If so, the original pointer is replaced by the value of the forwarding pointer. Otherwise, the old-space object referenced by the pointer is copied into new-space, a forwarding pointer is left in the old-space object, the scanned pointer is advanced, and the original pointer is replaced with a pointer to the new-space object which was just copied from old-space.

As new pages are added to the unscanned area, they are immediately protected before any objects are copied into them. The ScanObject routine stops when either a page boundary is crossed or when the unscanned pointer is reached (meaning there are no more unscanned objects in new-space).

Finally, the ScanPage routine unprotects the scanned page so the mutator can reference it.

It is important to note that the ScanPage routine can't unprotect a page before scanning it because then the mutator, running concurrently, would be able to reference unscanned objects. Most stock architectures with virtual memory also provide two modes, kernel and user; the operating system runs in kernel mode, and ordinary programs run in user mode. In addition, pages of memory have two protections, one for kernel mode and one for user mode. By running the Page Trap and Concurrent Scan threads in kernel mode and the mutator in user mode, and by changing only the user-mode protections of pages, the garbage collection threads can read and write pages not accessible to the mutator. Thus the array of protection flags 92 shown in FIG. 3 are user-level protection flags, not kernel-level protection flags.

To implement the preferred embodiment, one must add two new kernel calls to the operating system for the Page Trap and Concurrent Scan threads. At program startup, the garbage collector forks two threads which then make the kernel calls. The Page Trap and Concurrent Scan kernel calls never return until the program halts.

Memory Allocation

A memory allocation procedure, called Allocate, is called by the mutator to allocate space for a new object:

```
Allocate( size ) =
    LOCK gcLock DO
        unused := new − unscanned
        IF unused < size OR
            unused < FlipThreshold
        THEN
            Flip( )
        new := new − size
        RETURN new
```

If the size of the unused area (between scanned and new) is too small or is less than a given threshold, herein called the FlipThreshold, the collector initiates a flip. Then it allocates the object and returns. The FlipThreshold must be set large enough so that there is room for the collector to finish scanning, copying any remaining reachable objects into new-space.

During experiments with the present invention, the inventors discovered that the Allocate routine shown above caused the collector and the mutator (via the allocator) to contend for the global lock, gcLock. This contention would get worse in multitasking and multiprocessor systems using many mutator threads.

The following, modified Allocate routine overcomes the lock contention problem by using a two-stage allocation technique, where each mutator thread grabs off a large chunk of storage and then allocates from the chunk without holding the lock. Only when the Allocate routine needs another chunk does it get the lock and check for a flip:

```
Allocate( size ) =
    chunkLeft := chunkLeft − size
    IF chunkLeft < 0 THEN
        AllocateChunk( )
    chunkNew := chunkNew − size
    RETURN chunkNew
AllocateChunk( ) =
    LOCK gcLock DO
        unused := new − unscanned
        IF unused < ChunkSize OR
            unused < FlipThreshold
        THEN
            Flip( )
        chunkNew   := new
        chunkLeft  := ChunkSize
        new        := new − ChunkSize
```

The variables chunkNew and chunkLeft are specific to each mutator thread; chunkNew points at the last allocated object in the chunk, and chunkLeft is the space remaining in the chunk.

Besides reducing contention for the global lock, this version of th Allocate routine is small enough to be compiled inline. The thread-specific chunkNew and chunkLeft variables can be put in dedicated registers or in a thread-data area pointed to by one dedicated register. The Allocate procedure then compiles to just a few instructions, such as these VAX instructions:

```
sub12    size,chunkLeft
blss     CallAllocateChunk
sub12    size,chunkNew
```

Depending on the number of mutator threads and the actual value of ChunkSize relative to the cost of a page trap, it may be profitable to forego an explicit testing of chunkLeft, using instead an inaccessible guard page at the end of the chunk. When the allocator tries to initialize an object in the guard page, it will trap; the trap handler can then grab a new chunk and resume the mutator. But ChunkSize must be fairly big for the use of guard pages to be more efficient than explicit tests. And if there are a hundred or more threads (as there are in many systems), it may not be practical to have chunks that are large enough to use guard pages.

The sizing of the allocation chunks can be made processor-specific instead of thread-specific (assuming that there are far fewer processors than threads), but that introduces further complexity because allocations must be atomic relative to rescheduling, and implementing that on stock hardware would probably be at least as expensive as using an explicit test on the chunk size, as shown in Allocate routine above.

Flipping Old and New-space

Whenever new-space is filled (step 208 in FIG. 7) a garbage collection cycle is begun by flipping old-space and new space (step 210). The procedure Flip performs these steps:

Stop all the mutator threads.

Scan any remaining unscanned objects.

Flip the roles of the two spaces, and initialize the start, end, new, scanned, and unscanned pointers.

Copy the root reachable objects from old-space (steps 212, 214).

Resume the mutator threads.

Signal (i.e., set) the unscannedPages condition variable, so as to resume the Concurrent Scan thread.

"Root reachable objects" are those objects referenced in registers, in global variables not stored in the heap, and on stacks (if the stacks aren't stored in the heap 40).

One potential problem is that a flip can have rather high latency if there are a large number of root objects, such as large stacks or many threads (each with its own stack and registers). But the number of root objects copied at the time of the flip can be reduced using two tricks.

First, if stacks are not stored in the heap, then instead of scanning them during a flip, the collector just sets their pages to be inaccessible. The pages of a stack can then be scanned like pages of the unscanned area, both concurrently and incrementally as they are referenced by the mutator.

Second, even the registers of threads needn't be scanned at flip time. Instead, the Flip routine can stop the threads and change their program counters to the address of a special routine, saving away the old program counter values. It then resumes all the threads. When the thread is next scheduled and actually runs, it resumes at the special routine, which then scans the registers and jumps back to the original program counter value.

The latter technique is especially important when there are many more threads than processors, and many of those threads are blocked on locks or condition variables or are waiting for a remote procedure call to finish. (A large Modula-2+ program could have one-hundred-fifty threads or more.) Each thread's registers are scanned concurrently with the execution of other threads.

Before a flip, when there are no more objects in the unscanned area, all of old-space is known to be garbage. The collector discards those pages, reinitializing them to be demand-zero-on-write or undefined; this discards any backing store and physical memory attached to those pages. Backing store and physical memory will be reallocated on demand as the pages are referenced.

Multiple Mutators and Collector Threads

Figure 4:
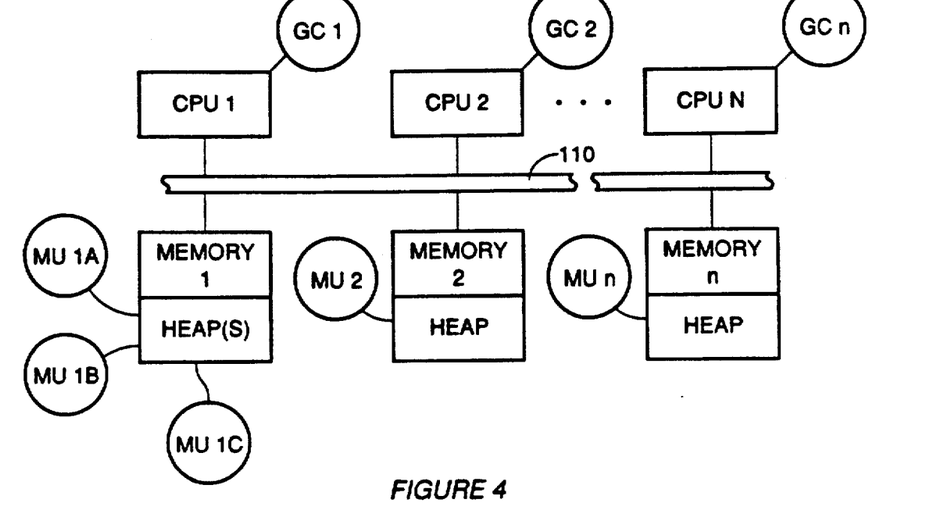
FIG. 4 is a block diagram of the present invention in a multiprocessor computer system.

Referring to FIG. 4, many multitasking and multiprocessor (CPU CPU n) computer systems allow the simultaneous operation of numerous mutator threads (MU 1A - MU n). In some implementations multiple mutators share a single heap (such as mutators MU 1A, MU 1B and MU 1C) while in others each mutator has its own heap (such as mutators MU 2 and MU n). Note, however, that "multiple heaps" can be viewed as partitions of a single heap and that therefore the differences between such systems are not particularly important to the present invention.

The question then becomes, how many garbage collector threads (i.e., pairs of Page Trap and Concurrent Scan threads) should there be in such a system? Assuming that each mutator thread has its own processor, then the critical resource is the thread that handles page traps and scanning (it doesn,t matter that there are separate threads for traps and scanning, since they are serialized by the global lock gcLock). In other words, if too many mutator threads are assigned to a single garbage collection thread, then the mutators will stall because the mutators are generating garbage faster than the collector can reclaim it and the system will not meet the concurrency and low latency requirements set forth above. Thus, the simplest and most practical solution is to have multiple trap and scanning garbage collection threads.

If there are multiple collector threads, one must insure that two such threads do not both try to copy the same old-space object at the same time. One way to prevent that is to have a lock for each object (which is expensive) or a lock for each page in old-space (which is relatively inexpensive). A lock bit per page also ensures that an object is copied at most once. Only at a flip must all the threads synchronize.

Some multiprocessor computer systems can provide "shared virtual memory", which is a single, shared virtual-memory address space for many processors having distinct physical memories. Pages are exchanged between processors using a high-bandwidth bus or local network 110 (see FIG. 4), with only one processor at a time allowed write access to a page. In such a system, it's crucial to ensure that processors don't thrash on a shared writable page.

The present invention, using multiple heaps, and one pair of Page Trap and Concurrent Scan garbage collection threads for each processor, is well suited for shared virtual memory systems. Because each mutator thread has its own assigned allocation chunk, as described above, there won't be thrashing of newly allocated pages. In addition, in a multiprocessor system having shared virtual memory, each processor would have its own collector thread. To scan a page, the garbage collector would, if necessary, acquire the page for write access from another processor. It then "pins" the page (i.e., locks the page at a fixed physical memory location) while scanning it, so as to prevent the page from being moved while it is being scanned. This imposes almost no extra overhead on the virtual memory implementation and naturally prevents thrashing by the collector threads.

The following sections address somewhat specialized topics of interest to those skilled in the art. While these aspects of the present invention are not "necessary" for building a simple implementation of the invention, they must be addressed in practical implementations.

Generational Collection

Generational collection can drastically reduce the work of a copying collector by scanning and copying far fewer objects. Many fewer pages are touched by the collector, resulting in better virtual-memory performance and reduced latency.

Generational collection is based on two observations: new objects have a higher death rate than old objects, and few old objects reference new objects. To implement generational collection, the collector allocates new objects in a small "new" area and remembers all pointers to new-area objects that the mutator stores outside of the new area. During most collections, only the new area and the remembered pointers must be scanned, copying only the new-area objects that are still alive. As objects survive collections, they are "aged"

and copied outside of the new area; the entire heap is collected very infrequently.

It has been shown that generational collectors can be implemented on stock hardware while reducing the demand on virtual memory. See David Ungar, "The Design and Evaluation of a High Performance Smalltalk System," MIT Press, 1987, and Robert A. Shaw, "Improving Garbage Collector Performance in Virtual Memory", Technical Report CSL-TR-87-323, Computer Systems Laboratory, Stanford University, 1987, both hereby incorporated by reference.

As will be understood by those skilled in the art, the above described preferred embodiment can be modified to work as a generational collector with relatively little effort. Instead of the traditional stop-and-copy to extract live objects from the new area, a generational collector can utilize the methodology of the present invention to collect concurrently while the mutators execute. Though the arrangement of the heap areas is somewhat different from that described above, the basic invariants are still maintained.

Large Objects

So far, we,ve assumed that the trap thread scans just the single page referenced by the mutator. We also assumed that each page in the unscanned area begins with an object and that no objects cross a page boundary, thus implying that no object could be bigger than a page.

For objects smaller than a page, the collector can skip to the next page whenever the object being copied doesn,t fit on the current page. If most objects are small relative to the page size, this doesn't waste much space. But when larger objects are encountered the wastage can become significant. Also, we need to be able to deal with objects larger than a page.

Some language implementations tag every word in the heap as a "pointer" or "non-pointer". The collector can thus scan any one page without regard to object boundaries, even if objects extend across page boundaries. Most such language implementations also provide non-pointer data types such as arrays of characters or numbers in which the words are not explicitly tagged; these objects would have to be segregated in a separate area that isn't scanned (like the new area).

Implementing the present invention in systems which use tagged pointers is very simple, but the simplicity costs time and space. The tag bits must be manipulated at runtime and the implementation must often use a level of indirection to combine pointers and scalars in the same object. Though compilers and hardware have been getting better at supporting tags, it still isn't clear that the simplicity of tagged implementations is worth the cost for commercial applications.

Figure 5:
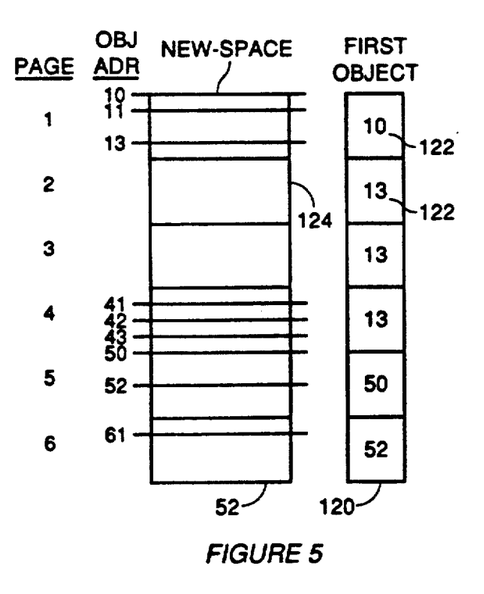
FIG. 5 is a block diagram of a mechanism for collecting large program objects.

Referring to FIG. 5, the preferred embodiment of the present invention does not depend on uniform tagged representations for handling large objects. Instead, it maintains a table called FirstObject 120 with one ent,ry 122 for each page 124 in the computer's memory space. If an object crosses the boundary between pages p-1 and p, then FirstObject[p] points to that object; if an object begins in the first word of page p, then FirstObject[p] points to that object.

As shown in FIG. 5, if an object X is several pages long and spans pages b, b+1 and b+2, FirstObject(b+2)=FirstObject(b+1)=pointer to X.

When the collector gets a page trap for page p, it uses FirstObject[p] to find the "first object" that spans the beginning of page p. It then scans only that part of the "first object" which is located in page p. Then it scans the objects wholly contained in page p. Finally, if there is an object that spans the boundary between pages p and p+1, it scans only that part of the object which is in page p.

Note that the FirstObject table must be maintained for objects in the unscanned area only, since that is the only part of new-space scanned as the result of page traps.

Objects much larger than a page (such as arrays) pose another problem: copying the object takes time proportional to its size, and thus the time for a page trap wouldn,t be bounded by a small constant. To solve this problem, we can use a technique similar to one suggested by Baker for incrementally copying and scanning arrays.

Each very large object in new-space is given an extra header word for storing a pointer its old-space copy. When the collector copies a very large object to the unscanned area, it just copies the object header and reserves space for the elements without actually copying them. It also stores in the new array header a pointer to the old-space copy of the array. On a page trap, the collector uses the FirstObject table to find the array header and the pointer to the old-space copy. The collector then copies and scans only those elements of the array that are on the referenced page. Similarly, the concurrent scanner thread of the collector copies and scans elements one page at a time.

Unlike Baker's scheme, this method of handling very large objects imposes no additional burden on the mutator's accessing operations (e.g., array indexing).

Scanning Stacks

Thread (i.e., program) stacks are potentially large objects requiring special treatment. In many language implementations, stacks are usually small. For example, the average size of a stack in a Modula-2+ program is about 300 bytes, which is less than a page. But any one stack could be much larger, especially in highly recursive algorithms, so the garbage collector needs to scan such stacks incrementally by protecting their pages after a flip and then fielding the page traps.

If the language implementation tags pointers and non-pointers as described above, then scanning individual stack pages is straightforward. But again, the preferred embodiment of the invention does not require tags.

Individual stack frames are small and bounded, with large objects always allocated in the heap (this is true, or could easily be made true, for most Lisp and Algol-family language implementations without affecting performance). Given a frame, the collector can easily discover its size and the location of pointers within the frame. (For example, there may be a map maintained by the compiler from program-counter locations to frame descriptors.)

Figure 6:
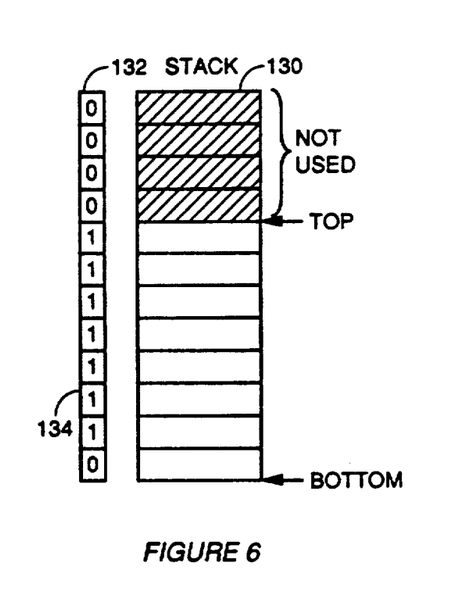
FIG. 6 depicts a mechanism for collecting large program stacks.

FIG. 6 shows the stack 130 for a single mutator with an array 132 of page protection flags having one flag 134 for each page of the stack 130. In FIG. 6, it is assumed that the bottom page of the stack 130 has been copied to new space as part of the root objects of the mutator, and that the other pages of the stack have yet to be collected and are therefore marked as protected.

In many languages, including Lisp, a mutator can reference only the top frame of a stack, and thus page traps can happen for the top frame only. But languages like Modula-2+ provide by-reference parameters in which a called procedure is passed a pointer to a stack-allocated object in the caller's frame; for these languages, the trap handler must be prepared for trapped page references anywhere in a stack.

When the mutator references a protected page in the middle of a stack, the trap handler must scan its pointers, and to do that, it must first find the frames on the page. It can start at the top or bottom of the stack (whichever is closer) and skip over frames until it gets to the referenced page. If a frame overlaps the page boundary, the trap handler scans only the fragment on that page.

Of course, skipping over frames to get to a page in the middle of a stack takes time proportional to the stack size, and if stacks have unbounded size the algorithm isn,t real-time. But in practice, skipping over frames is very cheap compared to the cost of scanning a page and can be considered a "constant". For example, supposing each frame has a dynamic link to the previous frame, the necessary inner loop would take about 2.5 milliseconds per 1000 frames on MicroVAX II. In contrast, it takes anywhere from 15 to 40 milliseconds to field a page trap and scan a page. Of course, implementations that don't have by— reference parameters won,t have to worry about middle-of-stack traps.

Scanning a stack concurrently while the mutator executes is not a problem. When the mutator attempts to change a write-protected stack page by, say, pushing and writing a new stack frame, the garbage collection algorithm traps and scans that page (just like any page in the unscanned region of the heap), thereby guaranteeing the page will be scanned first.

But the mutator can pop frames, unsynchronized with the collector, simply by adjusting the stack pointer. What happens if the collector starts scanning a page of stack frames while the mutator pops some of those frames from the stack? The collector could suspend a thread every time it scanned one of its stack pages, but that wouldn't be satisfactory for threads with large stacks; the scanning would be real-time but not concurrent.

Instead the collector can simply ignore the fact that some of the frames it is scanning may already have been popped, since the mutator can't change the page until it is fully scanned and unprotected. At worst, a few extra garbage objects recently popped from the stack may get copied and survive this collection. To minimize this possibility, the collector should examine the current stack pointer before scanning each stack page.

Finally, it may be better to scan stacks from the bottom up, since those objects are more likely to survive the current collection (pointers to objects on the top of the stack will soon get popped). The present invention requires no special bookkeeping or hardware to scan the stacks bottom up.

Derived Pointers

A "derived pointer" is a pointer into the middle of an object that may arise during the address calculation of an array or record access. Architectures like the VAX by Digital Equipment, the 68000 by Motorola, or IBM 370 provide efficient index-mode addressing, so derived pointers aren't necessary. But reduced-instruction-set (RISC) machines may not have index-mode addressing and thus require derived pointers for array indexing.

Derived pointers can cause problems for a concurrent collector. The collector may suspend the mutator threads at any time and initiate a collection. At the flip, the collector must know which registers contain derived pointers and the objects corresponding to those pointers.

The simplest scheme would reserve one or more register pairs to hold a pointer and its derivative, making it easy for the collector to identify derived pointers and their base objects. But this would make good code generation harder on a machine with relatively few registers (though newer RISC machines tend to have more registers).

A less-constraining scheme would mix pointers and derived pointers freely in registers, using the FirstObject table to find the base object of a pointer. The new object area 76 in the heap doesn't have an explicit FirstObject table, but the collector can assume that objects don,t cross the boundaries of allocation chunks. To find the base object of a pointer, the collector skips backwards to the first page starting with an object and then skips forward over objects until getting to the base object. This would take time proportional to the page size and the cost is much smaller than the cost of copying and scanning an object.

Since each thread has a small, constant number of registers and those registers are scanned concurrently after a flip is finished, neither latency nor concurrency would be affected.

A Sequential, Real-time Version

The present invention can be modified to work with single—threaded programs in which the collector is real-time but not concurrent. This sequential, real-time version would be suitable for languages implemented o traditional operating systems like UNIX (a trademark of AT&T) that allow access to virtual-memory facilities but don,t provide multiple threads or cheap synchronization.

To handle page traps by the single mutator thread, the collector provides a "trap handler" routine to the operating system that fields page traps (these are called "signal handlers" on UNIX). When the mutator references a protected page, the trap handler is invoked. The trap handler unprotects the page, scans it, and returns, automatically resuming the mutator.

To ensure that all reachable objects are copied before new-space fills up, the Allocate procedure scans a small number of unscanned objects every time it is called.

Because this version of the present invention is synchronous and single-threaded, there is no need for any kind of locking or special kernel-mode threads. It is easily implemented on many different variants of UNIX (for example, AT&T's System V, Apollo's Domain, DEC's Ultrix, and CMU's Mach all provide the necessary page-protection and trap-handling primitives).

But of course, this sequential version can't run the collector while the mutator is waiting for i/o, page faults, or interactions from the user. Even on single processor computers, more and more operating systems are starting to offer multi-threaded capabilities as support is added for distributed computing based on remote procedure calls.

Conclusions and Alternate Embodiments

As will be understood by those skilled in the art, a full implementation of the present invention requires only slight modification to most UNIX (a trademark of AT&T) and UNIX-like operating systems, and a real-time, sequential version can be built on many standard versions of UNIX. Further, the present invention will work with any compiler already geared for a copying collector.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system having
   a heap of dynamically allocated storage which is divided into old-space and new-space, each of which is further divided into a multiplicity of pages,
   a mutator task executed by the computer system which accesses objects stored in said heap; and
   a garbage collection process for recovering unused storage in the heap;
   a computer implemented method of garbage collection performed by said garbage collection process, the steps of the method comprising:
   copying at least one object from old-space into new-space and protecting those pages of said new-space which contain objects copied from old-space; and
   trapping each memory access by said mutator task to a protected page in a new-space, scanning objects in the protected page for pointers to objects in old-space which have not been previously copied into new-space, copying each such object in old-space into new-space and protecting those pages in said new-space which contain said copied objects, and then unprotecting said page to which memory access was trapped;
   whereby accessible objects in old-space are collected and copied into new-space a portion at a time.

2. In a computer system having
   a heap of dynamically allocated storage which is divided into old-space and new-space, each of which is further divided into a multiplicity of pages,
   a mutator task executed by the computer system which accesses objects stored in said heap; and
   a garbage collection process for recovering unused storage in the heap;
   a computer implemented method of garbage collection performed by said garbage collection process, the steps of the method comprising:
   copying at least a predefined root set of objects from old-space into new-space and protecting those pages of said new-space which contain said copied objects;
   trapping each memory access by said mutator task to a protected page in new-space, scanning objects in the protected page for pointers to objects in old-space which have not been previously copied into new-space, copying each such object in old-space into new-space and protecting those pages of said new-space which contain said copied objects, and then unprotecting said page to which memory access was trapped; and
   concurrently with said step of executing said mutator task, successively scanning each of said protected pages in new-space until there are no remaining protected pages in new-space; each protected page being scanned by scanning objects in the protected page for pointers to objects in old-space which have not been previously copied into new-space, copying each such object in old-space into new-space and protecting those pages of said new-space which contain said copied objects, and then unprotecting said scanned page;
   whereby accessible objects in old-space are collected and copied into new-space a portion at a time.

3. In a computer system having
   a heap of dynamically allocated storage which is divided into old-space and new-space, each of which is further divided into a multiplicity of pages,
   a mutator task executed by the computer system which accesses objects stored in said heap; and
   a garbage collection process for recovering unused storage in the heap;
   a computer implemented method of garbage collection performed by said garbage collection process, the steps of the method comprising:
   copying at least a portion of said root set of objects into new-space and protecting those pages of said new-space which contain said copied objects;
   trapping each memory access by said mutator task to a protected page in new-space, scanning objects in teh protected page for pointers to objects in old-space which have not been previously copied into new-space, copying each such object in old-space into new-space and protecting those pages of said new-space which contain said copied objects, and then unprotecting said page to which memory access was trapped; and
   concurrently with said step of executing said mutator task, successively scanning each of said protected pages in new-space until there are no remaining protected pages in new-space; each protected page being scanned by scanning objects in the protected page for pointers to objects in old-space which have not been previously copied into new-space, copying each such object in old-space into new-space and protecting those pages of said new-space which contain said copied objects, and then unprotecting said scanned page;
   whereby accessible objects in old-space are collected and copied into new-space a portion at a time.

4. In a multitasking computer having
   at least one mutator task; and
   a heap of storage space in which objects generated by said at least one mutator task are stored, said heap being divided into old-space and new-space, said new-space being divided into a multiplicity of pages;
   a memory management system, comprising:
   flip means, coupled to said heap, for interchanging old-space and new-space, and then copying at least one object from old-space into new-space and protecting those pages of said new-space which contain objects copied from old-space;
   memory allocation means, coupled to said heap and called by said at least one mutator task, for allocating portions of new-space for storing objects; said memory allocation means invoking said flip means when predefined conditions are met; and
   page trapping means, coupled to said heap, for trapping each memory access by said at least one mutator task to a protected page in new-space, scanning objects in the protected page for pointers to objects in old-space which have not been previously copied into new-space, copying each such object in old-space into new-space and protecting those pages of said new-space which contain said copied objects, and then unprotecting said page to which memory access was trapped;

wherein accessible objects in old-space are collected and copied into new-space a portion at a time.

5. In a multitasking computer having at least one mutator task;

a heap of storage space in which objects generated by each mutator task are stored, said heap being divided into old-space and new-space, said new-space being further divided into a multiplicity of pages; and root means, associated with each said mutator task, for identifying a root set of pointers which point to a root set of objects stored in said heap;

a memory management system, comprising:

flip means, coupled to said root means and said heap, for interchanging said old-space and new-space, copying at least a portion of said root set of objects from old-space into new-space, and protecting those pages of said new-space which contain said copied objects;

memory allocation means, coupled to said heap and called by said at least one mutator task, for allocating portions of new-space for storing objects; said memory allocation means invoking said flip means when predefined conditions are met;

page scanning means, coupled to said heap, for scanning objects stored in a specified protected page for pointers to objects in old-space which have not been previously copied into new-space, including means for copying each such object in old-space into new-space, protecting those pages of said new-space which contain said copied objects, and then unprotecting said specified page;

trap handling means, coupled to said page scanning means, for trapping each memory access by said at least one mutator task to a protected page in new-space and then calling said page scanning means to scan and unprotect said page; and concurrent scanning means, operating concurrently with each said mutator task and coupled to said page scanning means, for calling said page scanning means to scan and unprotect each of said protected pages in the new-space of the corresponding heap until there are no remaining protected pages in new-space.

6. A computer memory management system as set forth in claim 5, said multitasking computer including:

virtual memory protection means, coupled to said flp means, page scanning means and said trap handling means, including means for protecting specified pages from access by user level tasks but not from kernel level tasks; and means for designating said mutator tasks as user level tasks, for designating said trap handling means as a kernel level task, and for designating said page scanning means and concurrent scanning means as kernel level tasks.

7. A computer memory management system as set forth in claim 5, said page scanning means including means for storign a forwarding pointer in each copied old-space object, wherein said forwarding pointer points to a copy in new-space of said copied old-space object;

said page scanning means further including means for replacing each pointer in said protected page which points to an object in old-space that contains a forwarding pointer with said forwarding pointer.

* * * * *

UNITED STATES PATENT AND TRADEMARK OFFICE
CERTIFICATE OF CORRECTION

PATENT NO. : 5,088,036
DATED : February 11, 1992
INVENTOR(S) : John R. Ellis et al.

It is certified that error appears in the above-identified patent and that said Letters Patent is hereby corrected as shown below:

Column 17,
Lines 44 and 47, delete "process" and insert therefor -- program --
Line 46, after "a" delete "computer-implemented"

Column 18,
Line 18, after "comprising:" insert -- indentifying a root set of pointers which point to a root set of objects stored in said heap --
Line 24, delete "teh" and insert therefor -- the --

Column 20,
Line 15, delete "flp" and insert therefor -- flip --
Line 27, delete "storign" and insert therefor -- storing --

Signed and Sealed this

Twenty-eighth Day of June, 2005

JON W. DUDAS
*Director of the United States Patent and Trademark Office*